UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

PYROXYLINE COMPOUND.

SPECIFICATION forming part of Letters Patent No. 621,382, dated March 21, 1899.

Application filed March 1, 1898. Serial No. 672,211. (No specimens.)

*To all whom it may concern:*

Be it known that I, JOHN H. STEVENS, of the city of Newark, county of Essex, and State of New Jersey, have invented certain new and useful Improvements in Pyroxyline Compounds, of which improvements the following is a specification.

The compounds to which my invention relates generally consist of pyroxyline associated with solvents or other ingredients, and they are used in the arts as imitations of natural substances or in blasting and gunnery as explosives. The pyroxyline is sometimes sold or used alone or unassociated with other substances. In whatever form the pyroxyline is employed, however, there is danger of decomposition, especially under the influence of time or elevated temperatures. The exception to this is when the pyroxyline is kept thoroughly wet in an undissolved state, as is well understood.

The object of the present invention is to so form these compounds that the danger from decomposition will be prevented or reduced to a minimum. This I accomplish by combining with the pyroxyline or its admixture with other ingredients certain substances which I have found by experiment possess the power of preserving the pyroxyline in a remarkable manner. The class of substances to which I refer are the salts of the aromatic acids which are formed with inorganic bases. These acids consist principally of benzoic, salicylic, and naphtoic acids. There are numerous others, although they are of very little importance commercially, and hence I have selected those of most consequence as practical representatives of the entire class. The aromatic series of acids is well known to chemistry and needs no further description.

While the inorganic salts of benzoic and salicylic acids are well known, those of naphtoic acid are difficult to procure in commerce, but are easily made. I have used a number of the salts in this group and in every case found them to be more or less efficient for this purpose. While they all form permanent compounds with pyroxyline, cheapness, color, and comparative antacid power or intensity of effect cause some of them to be preferred to others. For general purposes I find that sodium benzoate gives excellent results. Potassium benzoate is also good. These two substances are especially valuable where pale effects are desired and also in cases where dissolved or converted pyroxyline or its compounds are required to be transparent—as, for instance, in imitation of amber or tortoise shell or for transparent sheeting. Transparency and color are often of no importance, in which case the salicylates of lithium, potassium, or sodium can be used if the operator so desires. Among other salts of this class which I have found to be of use are the salicylates of ammonium, of urea, and of zinc, the benzoates of ammonium, of lithium, and of zinc, and beta naphtoate of sodium. The ammonium salts yield yellowish products; but they do not interfere with the transparency of dissolved pyroxyline. Benzoate of lithium is especially suitable for imitations of yellow ambers and of tortoise shell. As a preserver of pyroxyline it seems to be superior to urea. Zinc benzoate is an excellent preserver, but is not suitable where extra transparency is desired. Zinc salicylate is also a good preserver and does not affect the transparency; but it is only suitable for dark colors. Sodium naphtoate (beta) forms a yellow product, which is also transparent. The yellowish tendency of the naphtoic acids is well known. Their salts resemble the salicylates in their action with pyroxyline. It is evident, therefore, that the salts of the aromatic acids are preserving agents for pyroxyline, although for practical purposes the operator can confine himself to the use of a preferred group. Such a group is represented by sodium benzoate, potassium benzoate, lithium benzoate, and salicylate of zinc. These will give the best results, and while the rest are more or less useful they need not be employed unless the preferred salts are unprocurable.

In practice I form pyroxyline compounds according to the usual well-known methods. The liquid solutions are made with sufficient excess of solvent to impart the requisite fluidity. The stiffer mixtures usually contain camphor or equivalent solid solvent along with sufficient liquid solvent for plastic effects.

Pyroxyline varies in its nature and solubility according to the purposes for which it is to be used. For smokeless powder or explosives the more highly nitrated varieties are employed, and solvents specially fitted for making solutions with such pyroxyline are also used.

While the preserving substances can be mixed with the pyroxyline either direct or in solution, it is best in order to insure a perfect mixture and intimate contact to have the preserving salt dissolved in some compatible menstruum and filtered. For this reason the best effects are produced with the salts which are soluble in wood spirit or grain alcohol.

In treating pyroxyline which is to be rendered stable without regard to its use with solvents I recommend the selection of preserving agents soluble in water. The pyroxyline can be moistened with the aqueous solution. When the water has evaporated, the preserving agent will be left behind in close contact with every particle of pyroxyline. As to proportions I have found that one part of the preserving salt to one hundred parts of pyroxyline is sufficient to render the pyroxyline, or the compounds made with it, of good stability. For extraordinary stability two per cent. is ample. Of course where I have indicated feebleness of preserving power more than two per cent. could be used to advantage. I recommend, however, the use of the preferred salts, or those which I have mentioned, as best suited for these purposes. I find that for the best effects it is well to employ the salts possessing the strongest preserving power, as, obviously, large proportions are undesirable. The operator will find that sodium benzoate is among the best of the present group. I do not confine myself to any particular proportions nor even to the particular salts mentioned, as I believe that I have proved that all of the salts of the aromatic acids are more or less useful. I have no explanation to offer for this peculiar preserving power of salts where the bases have already been saturated with an acid. I can only state that my experiments have demonstrated that they possess this power. I do find, however, that the nature of the acid radicle present in the salt determines its preserving power. Thus while benzoate of potassium preserves pyroxyline against decomposition the sulphite and bisulphite of potassium possess little or no preserving power. Sheets of pyroxyline compounds made with them stain metal polishing plates and easily turn acid. My experiments also show that in the case of salts of acids containing two or more dissimilar acid radicles the preserving action depends on the nature of the acid radicles. Thus a salt containing the radical of benzoic acid would have some antacid effect, even though the other acid radicle or radicles present possessed no power to form antacid salts. Similarly the salts containing two or more bases united to a single acid act as antacids according to the properties of the constituents. Hence I include in my invention the present series of salts of aromatic acids in pyroxyline compositions of matter, whether the salts are simple, compound, mixed, or associated chemically with other salts.

I am aware that in the older books on chemistry substances which are now considered as esters were also known as salts, and I have myself obtained Letters Patent for the use of some substances consisting of a combination of some of the acids referred to herein with an organic base; but such esters and substances will not act as antacids in my invention, and therefore my new group of antacid substances is confined to the salts of inorganic bases.

Having thus described my invention, what I claim, and desire to secure by Letters Patent, is—

1. A pyroxyline compound consisting of pyroxyline in combination with a salt of an acid of the aromatic series containing carboxyl (COOH), said salt having an inorganic base, substantially as described.

2. A pyroxyline compound consisting of pyroxyline and a solvent of the same associated with a salt of an acid of the aromatic series containing carboxyl (COOH), said salt having an inorganic base, substantially as described.

3. A transparent composition of matter containing pyroxyline and a salt of an acid of the aromatic series containing carboxyl (COOH), said salt having an inorganic base, substantially as described.

4. A transparent composition of matter containing pyroxyline and a solvent of the same associated with a salt of an acid of the aromatic series containing carboxyl (COOH), said salt having an inorganic base, substantially as described.

5. A transparent composition of matter containing pyroxyline and sodium benzoate, substantially as described.

JOHN H. STEVENS.

Witnesses:
ABRAHAM MANNERS,
CHARLES FRANKLIN.